F. R. SWEENY.
GEOGRAPHIC POSITION INDICATOR.
APPLICATION FILED JUNE 22, 1911.

1,086,242.

Patented Feb. 3, 1914.
4 SHEETS—SHEET 1.

WITNESSES:

INVENTOR
Francis R. Sweeny
BY Munn & Co
ATTORNEYS

F. R. SWEENY.
GEOGRAPHIC POSITION INDICATOR.
APPLICATION FILED JUNE 22, 1911.

1,086,242.

Patented Feb. 3, 1914.

4 SHEETS—SHEET 3.

WITNESSES:

INVENTOR
Francis R. Sweeny
BY Munn & Co
ATTORNEYS

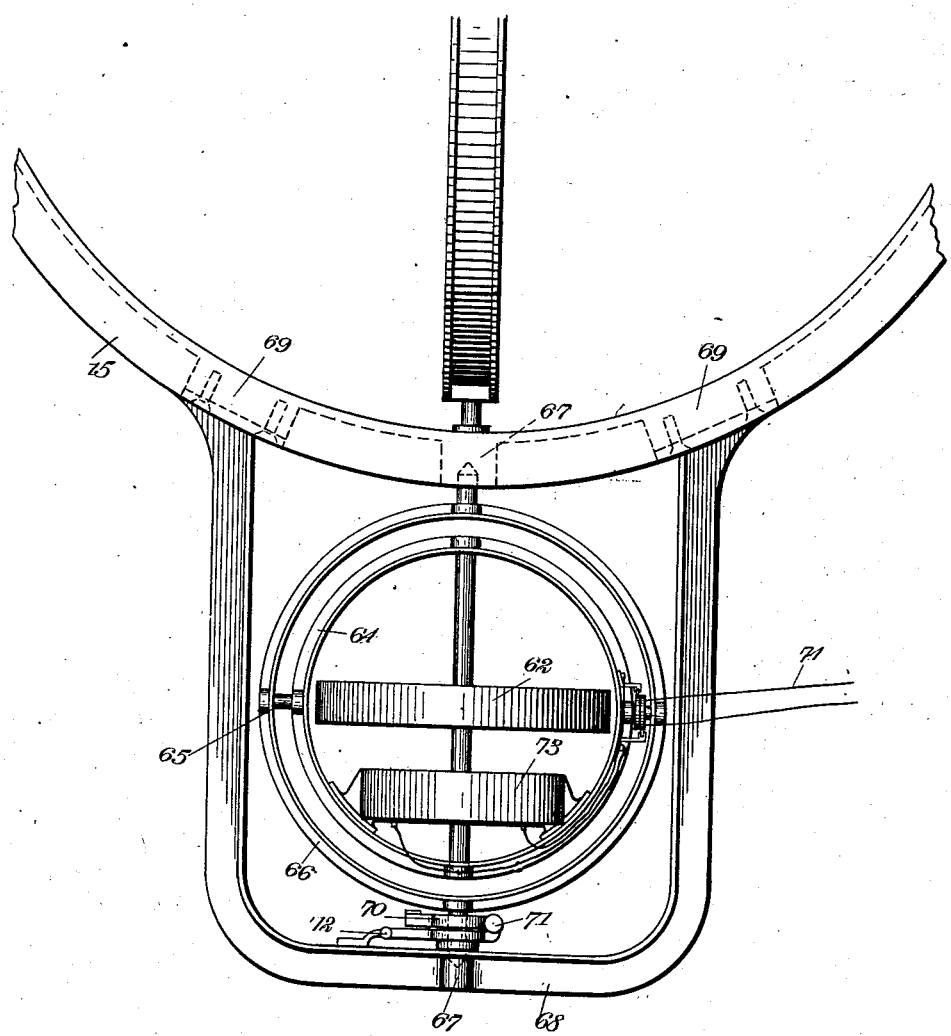

UNITED STATES PATENT OFFICE.

FRANCIS R. SWEENY, OF CLEMSON COLLEGE, SOUTH CAROLINA.

GEOGRAPHIC-POSITION INDICATOR.

1,086,242.  Specification of Letters Patent.  Patented Feb. 3, 1914.

Application filed June 22, 1911. Serial No. 634,680.

*To all whom it may concern:*

Be it known that I, FRANCIS R. SWEENY, a citizen of the United States, and a resident of Clemson College, in the county of Oconee and State of South Carolina, have invented a new and Improved Geographic-Position Indicator, of which the following is a full, clear, and exact description.

Among the principal objects which the present invention has in view are: To provide an apparatus to automatically and at all times indicate the position in degrees of longitude and latitude of a moving body; to provide in an apparatus of the character mentioned a plurality of members, one thereof being maintained parallel to the earth's polar axis and the other of said members being maintained fixed in space without reference to the earth's surface; to provide the said members above mentioned with indices adapted to show the variation of the plumb levels at all points on the earth's surface; and to provide in an apparatus of the character mentioned means convenient for initially setting and freely operating the instrumentalities of the said apparatus.

One embodiment of the present invention is disclosed in the structure illustrated in the accompanying drawings, in which like characters of reference denote corresponding parts in all the views, and in which—

Figure 1:
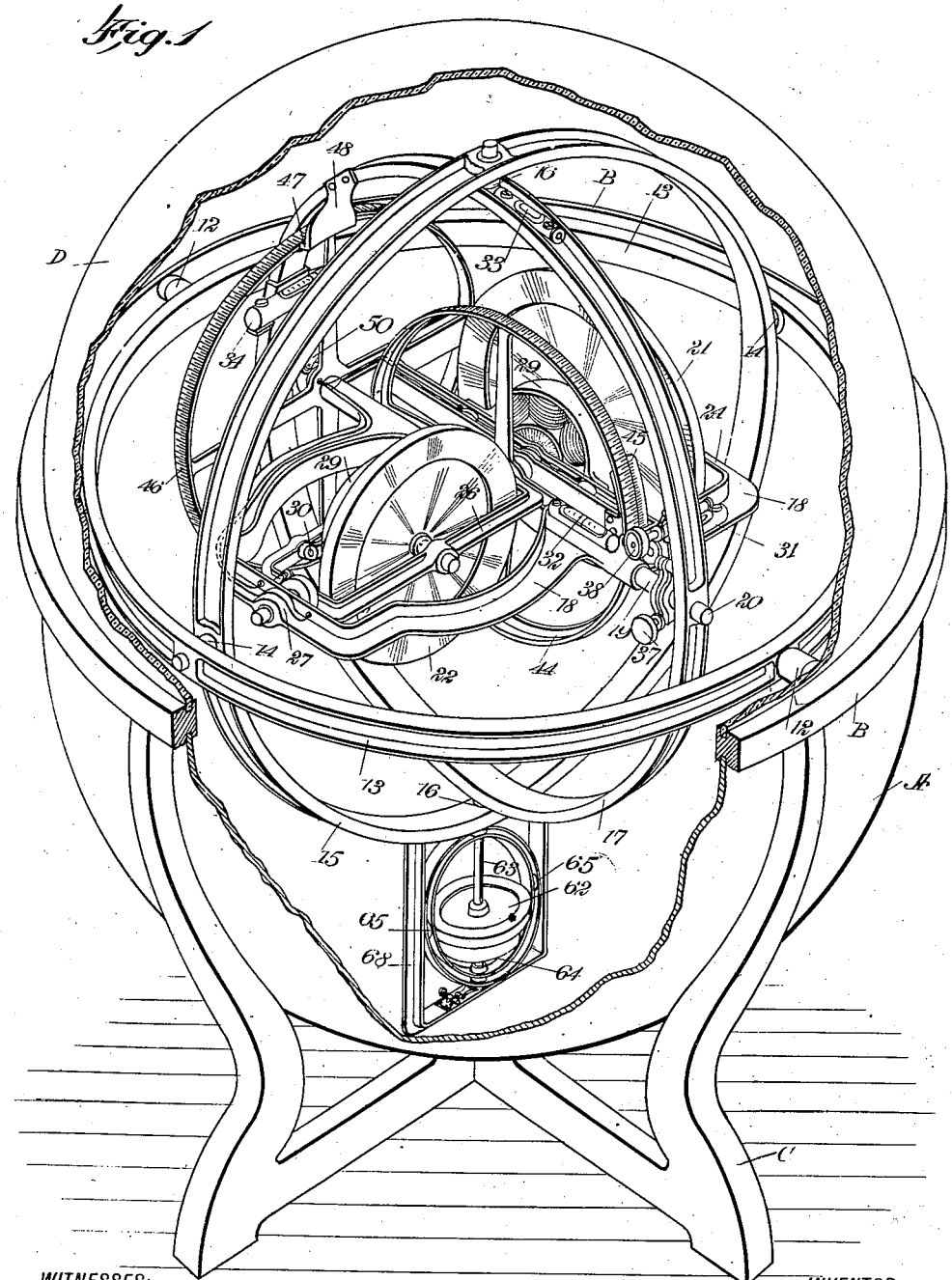
Figure 2:
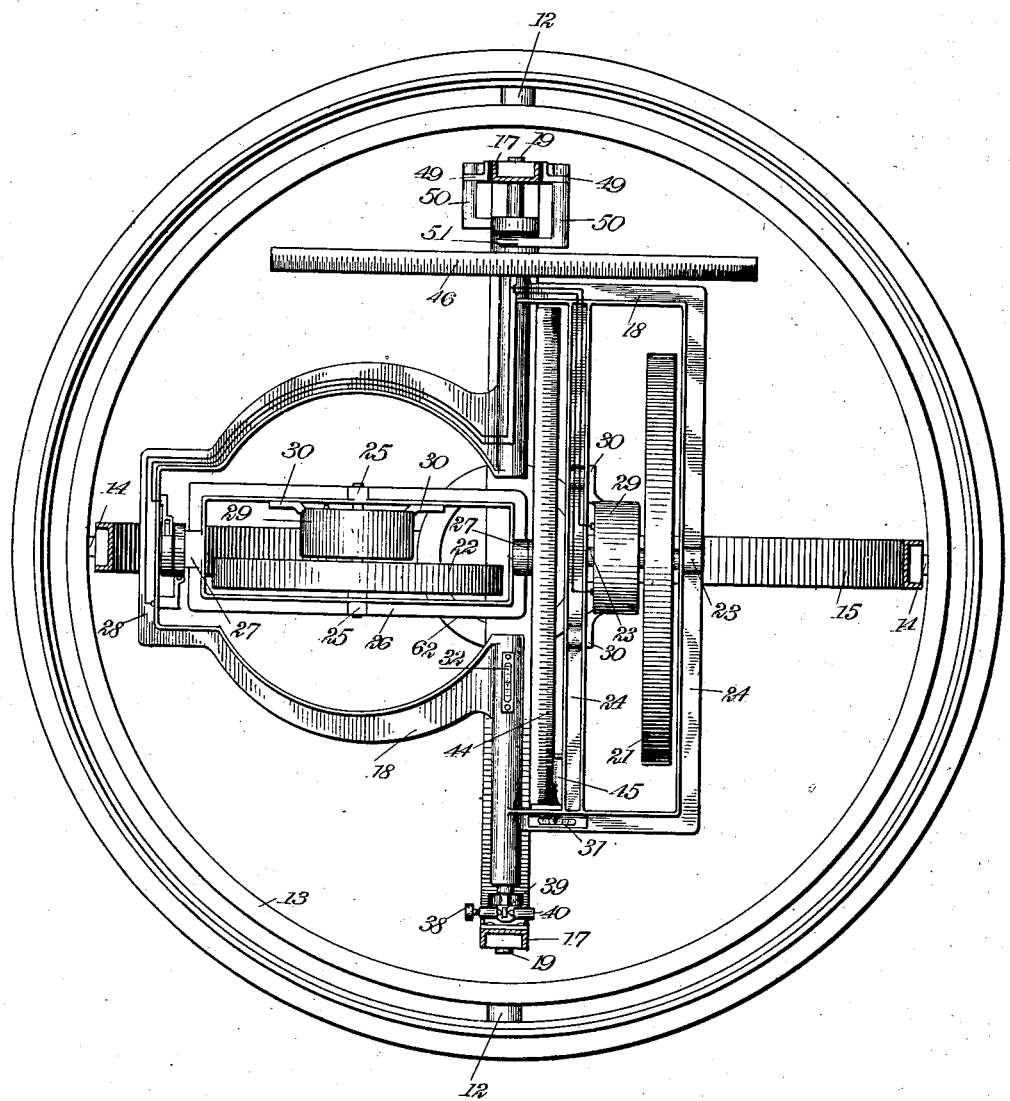
Figure 3:
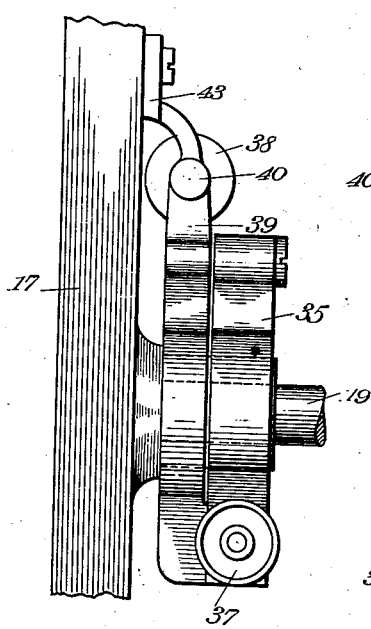
Figure 4:
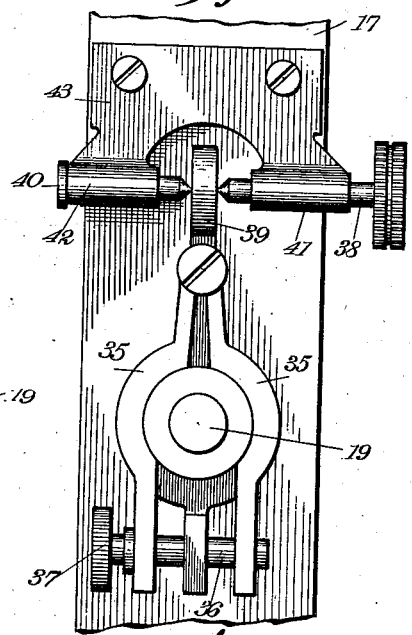
Figure 5:
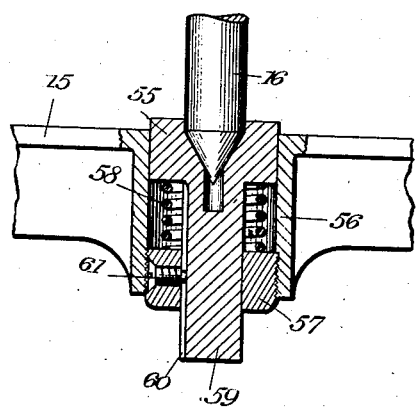
Figure 6:
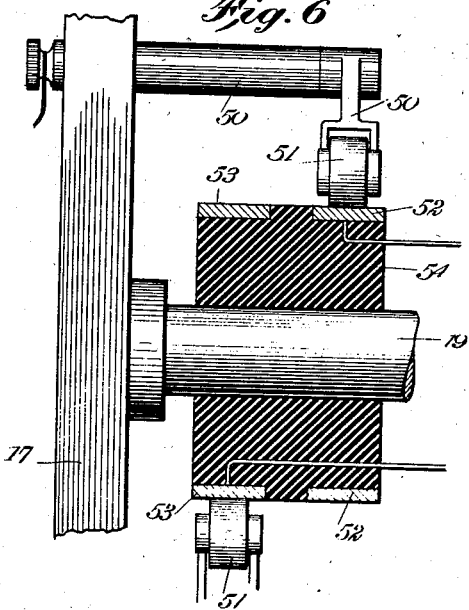

Figure 1 is a perspective view of an apparatus constructed and arranged in accordance with the present invention, showing the same as disclosed in a case for safe keeping and for observation; Fig. 2 is a horizontal section of the apparatus, the upper portion of the balancing gimbals being removed; Fig. 3 is a side view in detail and on an enlarged scale, of one of the holding clamps for the gyroscopically controlled frame; Fig. 4 is a face view of the same; Fig. 5 is a detail view in section of one of the bearings employed for mounting the shafts employed in the present invention; Fig. 6 is a detail view on an enlarged scale, showing the means employed by me for transferring the electric current employed in conjunction with the apparatus from the relatively fixed to the relatively rotary parts thereof; and Fig. 7 is a detail view in side elevation of a lower fragment of one of the suspending gimbals together with a gyroscope arranged for use in conjunction with a gyroscopically controlled frame.

In one employment of the apparatus the same is carried on board a ship, being supported in a case constructed and arranged as shown in Fig. 1 of the drawings, having preferably a globe-like body A, which is supported by an annular ring B having legs C. The upper half of the case is preferably constructed from transparent material, such as a glass half globe D. Within the case thus formed, and supported upon trunnions 12, is a preferably balanced ring or gimbal 13. Supported on the gimbal 13, on trunnions 14 disposed diametrically opposite the trunnions 12, is a ring or gimbal 15. It will be noted that the trunnions 12 and 14 are mounted in the same plane. Being diametrically opposed, the bearings provide for rocking the said case while the gimbals and machinery supported thereby maintain a horizontal level.

Mounted within the gimbal 15 by means of the vertically disposed trunnions 16 is a supporting ring 17. The ring 17 pivotally supports a frame 18, the same being provided with a shaft 19 which is furnished with journal bearings in the boxes 20. The boxes 20 are disposed on the ring 17 in the same plane with the trunnions 12 and 14. The frame 18 is accurately balanced to support two gyroscopes 21 and 22. The gyroscope 21 is mounted in bearings 23 formed in the rails 24. The gyroscope 22 is mounted in bearings 25 formed in an accurately balanced frame 26, as seen in Fig. 2 of the drawings. The frame 26 is provided with bearings 27. Each of the gyroscopes is driven by an electric motor 29, the frames whereof are connected by feet 30 to the frame 18, and to the frame 26. The armatures of the said motors are mounted on the shafts of the gyroscopes 21 and 22, respectively.

The frame 18, with the gyroscopes 21 and 22, and driving mechanism connected therewith, are evenly balanced on the shaft 19. The frame 26 is evenly balanced in the bearings 27. Any suitable means for increasing and diminishing the weight of either side of the said frame 18 may be employed. It has been deemed inadvisable to show such a construction in the present drawings. The frame is provided on one of the longitudinal sides with a fluid level 31 which indicates the out of level condition of the said frame. A similar level 32 is provided on the frame 18 extending perpendicular to the level 31, and preferably mounted in line with the shaft 19. To plumb the gimbal 15 and the ring 17 the latter is temporarily provided with fluid levels 33 and 34. After each part of the apparatus has been separately balanced and all the parts are assembled, the resultant center of gravity will be in vertical line with the intersection of the axes of said gimbals. The gimbals and supporting rings are each made heavier on the lower half. This results in locating the center of gravity of the whole below the intersection of said axes. Also the center of gravity of the apparatus will be below its geometric center and hold the same truly vertical; and the shaft 19 horizontal. When adjusted the ring 17 stands vertical and the shaft 19 horizontal. The levels 33 and 34 may be removed. When in position they are mounted as best seen in Fig. 1 of the drawings, in mutually perpendicular relation, and operate as telltales, should the assembled parts prove to be unbalanced. By rotating the ring 17 within the gimbal 15 about the trunnions 16, and observing the play of the spots on the levels 33 and 34, an accurate adjustment can be made for truing the balance of the apparatus. Each trunnion is provided with clamping jaws 35. These jaws are drawn together by double pitched screw 36. The pivoted structures are thus locked in position. The screw 36 is provided with the knurled head 37, as best seen in Figs. 3 and 4 of the drawings. When thus locked the shaft 19 is rocked by manipulating the thrust bolt 38 to rest against the side of the bracket plate 29. On the opposite side of the bracket plate 39 is a spring moved plunger bolt 40. The screw 38 and bolt 40 are respectively mounted in bearings 41 which are extended from the bracket plate 43 mounted rigidly on the ring 17.

When the electric motors 29 have been energized and are operating at speed in each clamp, the screw 36 is manipulated to open the jaws 35. It will now be observed that in conformity with the law controlling the action of gyroscopes, the two gyroscopes 21 and 22 will continuously maintain themselves in the plane in which they are initially set and so long as the rotation of the said gyroscopes is continued.

It will be observed, that as the machine is moved from point to point on the earth's surface the plumb line of the said machine will vary to conform with the movements, while the frames 18 and 26 maintain the initial disposition or the planes in which they were primarily set. By taking advantage of this difference in action of the ring 17 and the said frames 18 and 26, there may at all times be indicated in the machine the position of the machine relative to the earth's surface.

Adjustably mounted on the trunnion of the frame 26, resting in the bearings 27, is a graduated ring 44. The ring 44 is suitably graved to show 360 major divisions corresponding to the 360° of the complete circle, the major divisions being subdivided to suit. A vernier plate 45 is rigidly mounted on the frame 18 to read upon the divisions of the ring 44. Adjustably fixed on the shaft 19 is a graved ring 46 similar in construction and marking to the ring 44 which is disposed in a plane perpendicular to the plane of the ring 44. A vernier plate 47 is formed as a flange from a bracket 48, which is fixedly secured to the ring 17. By the verniers 45 and 47 may be read the degrees of rotation of the rings 44 and 46 respectively. By preference the ring 46 is disposed in a plane parallel with the earth's axis and is employed to indicate the degrees of latitude; and the ring 44 being perpendicular to the plane of the ring 46 is employed to show the degrees of longitude and thus conjunctively indicate the position of the machine on the earth's surface.

It will be understood that the rings 44 and 46 are fixed to move with the frames 26 and 18 respectively, while the vernier 45 is mounted on the frame 18 and the vernier 47 is mounted on the ring 17. The ring 17 rocks the frame 18 about the axis of the gyroscope 21 or trunnions 14 of the gimbal 15 while the gyroscope 22 maintains the ring 44 in the position originally set. Therefore, as the vessel or carrier, provided with a machine of the character mentioned, travels to the west or east the vernier 45 is shifted over the ring 44 to indicate, by reading thereon, at stated times, as indicated by a chronometer carried on board, the number of the degree of longitude and fraction thereof indicating the geographic position of the vessel east or west of the standard meridian.

It will also be understood that the adjustment of the gimbal 15 by gravity changes the plane of the ring 17 relative to the plane of the gyroscope 21. This change of planes causes the vernier 47 to travel over the ring 46, the latter being held fixed on the frame 18. The reading of the vernier 47 upon the ring 46 ascertains the degrees of latitude at all times to which the vessel has traveled. Therefore by reading the vernier 47 and ring 46, and the vernier 45 and ring 44, the exact geographic position of the vessel, expressed in latitude and longitude, is at all times ascertained.

The prime movers for rotating the gyroscopes 21 and 22 are the electric motors 29. The wiring for the leading in the current to these motors may be of any approved form; one form is shown in Figs. 2 and 6 of the drawings. On the ring 17 adjacent one end of the shaft 19 are mounted brackets 49 in which are rotatably mounted the brush arms 50. At the ends of each arm 50 is provided a wheel 51. Each wheel 51 rolls on a contact ring 52, 53, said rings being separated and mounted on an insulating block 54 rigidly attached to the shaft 19. From the rings 52 and 53 respectively are extended the wires constituting the mains of the circuit conveyed to the commutators of the motors 29. By preference the two motors 29 are mounted in series. The wires from the arms 50 are carried through suitable boxes formed in the body A, the wires being sufficiently flexed to avoid interference with the action of the machine.

A preferred form of the bearings for the various gimbals and rings above mentioned is best seen in Fig. 5 of the drawings, where is depicted the trunnion 16 and a fragment of the gimbal 15. The bearing provided is a cone-shaped recess in the block 55. The block 55 is suitably mounted in a housing 56, and is supported therein by a threaded collar 57 adapted to engage the threads in the lower end of the said housing 56. Interposed between the collar 57 and the head of the block 55 is a spiral spring 58. The spindle 59 is provided with a groove 60. Into the groove 60 is extended a pintle end of a screw 61.

The function of the spring 58 in each of the bearings is to compensate for any wear on the bearings and so preserve constant the center of gravity of the machine. While I have shown and prefer the form of bearing in Fig. 5, it will be understood that I do not intend to limit myself to the use of this form of bearing only. In many instances I prefer ball bearings for mounting the various trunnions.

In the above description it has been stated that the various rings and gimbals supporting the frames 18 and 26 are rocked to conform to the varying perpendicular of gravity. For this purpose any suitable weight may be suspended from the gimbal 15. Such a device, however, would swing with the vessel or other carrier of the machine, and the readings of the verniers 45 and 47 would be difficult. It is to provide for steadying the gimbals 13 and 15 that there is provided as a plumbing weight the gyroscope 62, which is suspended on a vertical shaft 63. The ring 64 is provided with trunnions 65 having bearings in a ring 66, the trunnions whereof are mounted in vertically disposed bearings 67. The ring 66 is supported in a hanging frame 68, the bolting flanges whereof are secured in blocks 69 formed in the gimbal 15. For the lower trunnion of the gimbal 66 there is provided the clamping jaws 70 and a locking screw 71. The gyroscope 62 is driven by an electric motor 73, the wiring 74 therefor being mounted in the manner above described with reference to the motors 29.

While the weight of the gyroscope 62, motor 73 and parts connected therewith serves the purpose above stated, to plumb the machine at all times, the gyroscope serves the further purpose of arresting when desired the vibration of the machine. This vibration may at any time be arrested by energizing the motor 73.

When it is desired to read the markings on the ring 46 the operator disposes the gimbals 64 and 66 of the gyroscope 62 parallel with the said ring 46. He then turns the current on the motor 73 to operate the gyroscope. This arrests the swing of the machine in the plane of the said gimbals 64 and 66. If any force is there brought to bear upon the gyroscope 62, tending to rotate it in the said plane, the machine will retain its position due to the gyroscopic force, while the gyroscope 62 precesses about the axis 65, 65. The vernier 47 and the ring 46 are then relatively stationary and the closest reading is possible. The motor operating the gyroscope 62 is then stopped and the gimbals 64 and 66 are disposed parallel with the ring 44, and the motor and gyroscopic action is resumed. The reading of the markings on the ring 44 is then noted.

It will be observed that in each of the settings of the gimbals 64 and 66 the gimbals 13 and 15 may swing in a direction transverse the axis 65, 65. When the two readings have been obtained the operator discontinues the service of the motor 73, when the gyroscopic action determines, and the gyroscope and motor connected therewith become plumbing weights for the machine.

When employing a machine of the character described and shown the usual method is as follows: It will be understood that the parts comprising the present machine have been individually and collectively carefully balanced. If the machine has been standing and the gyroscopes not operating, prior to starting the gyroscopes, the frames 18 and 26 are set in positions where the rings 46 and 44 indicate the latitude and longitude of the locality in which the vessel or machine then is. This is accomplished by manually rocking the frame 18 on its shaft 19 until the reading of the vernier 47 and the ring 46 indicates the exact known latitude of the position. In the operation of setting the frame 18 the same is micrometrically adjsuted by manipulating the screw 38 after the jaws 35 have been clamped upon the shaft 19. By this means the necessary refinement of adjustment of the vernier and the ring may be obtained. Similar means are employed for setting the frame 26, whereby the indicated position of the machine as shown by the reading of the vernier 45 and the ring 44, is made to correspond with the known longitude of the position. The frame 18 is so adjusted that the axis 27—23 of the said frame is placed in the plane of the geographic meridian. This may be accomplished by employing a compass, or other approved means, for establishing the true north. The machine is thus accurately set to indicate the known geographic position of the point of departure. The frames 18 and 26 and the rings 44 and 46 are thereafter maintained in fixed relation in space by the operation of the gyroscopes 21 and 22 which is now inaugurated, irrespective of the gravity perpendiculars of the machine.

It will be understood that as the machine is moved from point to point on the earth's surface, the plumb line through the center of gravity of the machine, or the gravity perpendiculars, will vary, the relative arrangement of the ring 17 carrying the vernier 47, and the frame 18 and the ring 46 mounted thereon; and that the reading of the vernier and ring will at all times indicate with the same precision the degrees of latitude of the new position. In a similar manner the variation of arrangement between the ring 44 and the vernier 45 will indicate the degrees of longitude of the new position.

It will be understood that when the above described apparatus is mounted in the most approved form, the case formed by the body A and the half-globe D is adapted to maintain a partial vacuum when formed therein. Means for forming the vacuum, together with the attachment of the same to the case, are not shown in the accompanying drawings. Any suitable means may be employed. While I prefer to operate the gyroscopes in a vacuum or rarefied atmosphere thus established in the manner stated, it will be understood that this is not essential, as the apparatus will operate perfectly in any atmosphere. It is not deemed necessary, though preferred, that the apparatus should be covered, it being, however, thought advisable to protect the bearings from wear and the apparatus from the effect of air currents.

Having thus described my invention, what I claim as new and desire to secure by Letters Patent is:—

1. A geographic position indicator, comprising a gravity actuated frame; a gyroscopically controlled frame pivotally mounted within said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; and means carried by said frames for denoting the variation in the angularity of the planes of said frames.

2. A geographic position indicator, comprising a gravity actuated frame; a balancing supporting structure for said frame; a gyroscopically controlled frame pivotally mounted within said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; and means carried by said frames for denoting the variation in the angularity of the planes of said frames.

3. A geographic position indicator, comprising a gravity actuated frame; balancing gimbals for supporting said frame, said frame being pivotally mounted in one of said gimbals; a gyroscopically controlled frame pivotally mounted in said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; and means carried by said frames for denoting the variation in the angularity of the planes of said frames.

4. A geographic position indicator, comprising a gravity actuated frame; a balancing supporting structure for said frame; a gyroscopically controlled frame mounted pivotally within said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; means carried by said frames for denoting the variation in the angularity of the planes of said frames; and a gyroscopic device mounted on said gravity actuated frame operable at will for arresting the movement of said structure.

5. A geographic position indicator, comprising a gravity actuated frame; balancing gimbals for supporting said frame, said frame being pivotally mounted in one of said gimbals; a gyroscopically controlled frame pivotally mounted in said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; means carried by said frames for denoting the variation in the angularity of the planes of said frames; and gyroscopic devices mounted on said gravity actuated frame operable at will for arresting the movement of said gimbals.

6. A geographic position indicator, comprising a gravity actuated frame; a gyroscopically controlled frame pivotally mounted within said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; and a plurality of graduated members adjustably fixed on one of said frames to indicate the movement of one of the adjacent frames, said graduated members being adjustable at will for initial reading.

7. A geographic position indicator, comprising a gravity actuated frame; a gyroscopically controlled frame pivotally mounted within said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; a plurality of graduated members adjustably fixed on one of said frames to indicate the movement of one of the adjacent frames, said graduated members being adjustable at will for initial reading; and a plurality of locking devices for holding the said frames in adjusted position.

8. In a geographic position indicator, a pivotally mounted spider frame; a gyroscope mounted in said frame the axis of said gyroscope being perpendicular in the pivotal axis of said frame; a second frame pivotally mounted in said spider frame the pivotal axis of said second frame being coincident with the axis of said gyroscope; a second gyroscope mounted in said second frame the axis of said second gyroscope being disposed perpendicular to the pivotal axis of said second frame; and a plurality of prime movers one being operatively connected to each of the said gyroscopes.

9. In a geographic position indicator, a pivotally mounted spider frame; a gyroscope mounted in said frame the axis of said gyroscope being perpendicular to the pivotal axis of said frame; a second frame pivotally mounted in said spider frame the pivotal axis of said second frame being coincident with the axis of said gyroscope; a second gyroscope mounted in said second frame the axis of said second gyroscope being disposed perpendicular to the pivotal axis of said second frame; and a plurality of electric motors one of said motors being drivingly connected with each of said gyroscopes to rotate the same.

10. In a geographic position indicator, a pivotally mounted spider frame; a gyroscope mounted in said frame the axis of said gyroscope being perpendicular to the pivotal axis of said frame; a second frame pivotally mounted in said spider frame the pivotal axis of said second frame being coincident with the axis of said gyroscope; a second gyroscope mounted in said second frame the axis of said second gyroscope being disposed perpendicularly to the pivotal axis of said second frame; a plurality of prime movers one being operatively connected to each of said gyroscopes; and means for mechanically adjusting said frames on their pivotal bearings.

11. In a geographic position indicator, a pivotally mounted spider frame; a gyroscope mounted in said frame the axis of said gyroscope being perpendicular to the pivotal axis of said frame; a second frame pivotally mounted in said spider frame the pivotal axis of said second frame being coincident with the axis of said gyroscope; a second gyroscope mounted in said second frame the axis of said second gyroscope being disposed perpendicularly to the pivotal axis of said second frame; a plurality of prime movers one being operatively connected to each of said gyroscopes; means for adjusting said frames; and means for locking said frames in adjustment prior to operating said gyroscopes.

12. A geographic position indicator, comprising a gravity actuated frame; a balancing supporting structure for said frame; a gyroscopically controlled frame pivotally mounted within said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; means carried by said frames for denoting the variations in the angularity of the planes of said frames; and a containing case having a transparent cover and adapted to maintain a partial vacuum when formed therein.

13. A geographic position indicator, comprising a gravity actuated frame; a balancing supporting structure for said frame; a gyroscopically controlled frame pivotally mounted within said gravity actuated frame; a second gyroscopically controlled frame pivotally mounted in the first mentioned gyroscopically controlled frame the pivotal axis of said second gyroscopically controlled frame being coincident with the gyroscopic axis of said first mentioned gyroscopically controlled frame; a plurality of gyroscopes operatively connected one with each of said frames, each of said gyroscopes being disposed with its axis perpendicular to the axis of the frame to which it is operatively connected; means carried by said frames for denoting the variations in the angularity of the planes of said frames; and a containing case for said structure adapted to maintain a partial vacuum when formed therein.

In testimony whereof I have signed my name to this specification in the presence of two subscribing witnesses.

FRANCIS R. SWEENY.

Witnesses:
 HALE HOUSTON,
 STYLES HOWARD.